(12) United States Patent
Lipson

(10) Patent No.: US 7,850,888 B2
(45) Date of Patent: Dec. 14, 2010

(54) STRIPED DRINKING STRAW AND METHOD OF MAKING THE SAME

(76) Inventor: Erik Lipson, 200 W. Washington Sq., #1809, Philadelphia, PA (US) 19106

( * ) Notice: Subject to any disclaimer, the term of this patent is extended or adjusted under 35 U.S.C. 154(b) by 0 days.

(21) Appl. No.: 12/488,807

(22) Filed: Jun. 22, 2009

(65) Prior Publication Data

US 2009/0256288 A1    Oct. 15, 2009

Related U.S. Application Data

(63) Continuation of application No. 11/292,555, filed on Dec. 2, 2005, now Pat. No. 7,549,854.

(60) Provisional application No. 60/633,102, filed on Dec. 3, 2004.

(51) Int. Cl.
*B29C 53/14*    (2006.01)

(52) U.S. Cl. .............. 264/209.2; 264/151; 264/171.29; 425/322

(58) Field of Classification Search ................. 425/321, 425/322, 334; 264/150, 171.29, 209.2, 151, 264/400, 209.3, 210.2
See application file for complete search history.

(56) References Cited

U.S. PATENT DOCUMENTS 3,234,312 A  *  2/1966  Friedrich ................. 264/209.5

* cited by examiner

*Primary Examiner*—Kat Wyrozebski
*Assistant Examiner*—Robert J Grun
(74) *Attorney, Agent, or Firm*—Gifford, Krass, Sprinkle, Anderson & Citkowski, P.C.

(57) ABSTRACT

Extruded, striped drinking straws are formed by coextruding at least two polymers of different color through a common extruder to form an elongated tube. An oscillator consisting of a pair of rolls supported for rotation about their central axes, extending normally to the extension of the tube, bear against opposed sides of the tube and are reciprocated in opposing directions so as to rotate the tube by a gear and spline mechanism. A straight puller draws the tube out of the extruder and through the twisting oscillator and a cutter forms the tube into straw lengths at the output of the puller.

4 Claims, 2 Drawing Sheets

STRIPED DRINKING STRAW AND METHOD OF MAKING THE SAME

CROSS REFERENCE TO RELATED APPLICATIONS

This application is a continuation of U.S. patent application Ser. No. 11/292,555 filed Dec. 2, 2005, which claims priority of U.S. Provisional Patent Application Ser. No. 60/633,102 filed Dec. 3, 2004, which is incorporated herein by reference.

FIELD OF THE INVENTION

This invention relates to a novel form of striped drinking straw and to a method of making the same utilizing an extrusion process.

BACKGROUND OF THE INVENTION

Drinking straws formed of multicolored materials have been previously proposed. In one form of such drinking straws, plastic materials of different colored properties are coextruded so as to produce stripes extending parallel to the length of the straw. In another form of drinking straw the striped straws are produced by a process in which the extruded unit is twisted in one direction so as to produce spirals along the length of the straw, i.e., in the form of a barber pole. These straws are relatively difficult to manufacture because continual twisting of the straw in one direction makes it difficult to cut the straws to length after they exit a pulling and twisting device, and difficult to feed the straws into a subsequent automated machine, such as a packaging machine, because of the continual twisting.

SUMMARY OF THE PRESENT INVENTION

The present invention relates to a novel form of an extruded, striped drinking straw and to a method of forming the same through an extrusion process. The novel straws produced by this method are striped, but the stripes are not in a constant direction like a barber pole; rather, the direction of rotation of the stripes continually reverses along the length of the straw, producing a straw that is significantly different and more varied in appearance than the normal twisted type.

The present straw is produced using an extruder into which at least two polymers of different colors are fed to produce linear stripes along the length of the tube. The extruded tube then passes through a cooling tank of conventional design and then passes through oscillating rolls of a novel design. This oscillator consists of a pair of rolls rotatable about axes normal to the length of traverse of the straw from the extruder, with one arranged above the tube and the other below the tube, so that they pinch the tube. The two rollers may be resiliently urged toward one another, so as to firmly engage the tube. As the tube progresses through the oscillating rollers, the rollers are subjected to opposed reciprocating motions along their central axes, normal to the direction of motion of the extruded straw, in timed relationship to one another, so that as the top roller moves transversely to the straw in a first direction, the bottom roller moves in the opposite direction at the same rate. This axial motion of the rolls is reversed at intervals, which may be either regular or irregular, to produce different patterns in the extruded straw. Thus, the direction of rotation of the stripes is reversed at either regular or random intervals to produce interesting patterns in the straw.

The twisting imparted to the tube by the oscillating rolls causes the striped tube emerging from the extruder to twist, and passage of the twisted tube through the cooling tank sets the twist.

The straw is drawn from the extruder, through the cooling tank and the oscillator by a conventional puller which does not twist the extruded plastic tube. The tube then passes through a cutter which cuts straw lengths from the tube and feeds them, in a non-twisting manner, to a subsequent automated machine, such as a packaging machine.

The tube of the present invention may also be decorated by a conventional laser which is stationary, yet decorates all sides of the tube because of its position at a point where the tube is twisting, before the puller. The laser thus decorates the entire tube without being required to rotate about the axis of the tube.

BRIEF DESCRIPTION OF THE DRAWINGS

Other objects, advantages and applications of the present invention will be made apparent by the following detailed description of a preferred embodiment to the invention. The description makes reference to the accompanying drawings in which.

DETAILED DESCRIPTION OF THE PREFERRED EMBODIMENT

Figure 1:
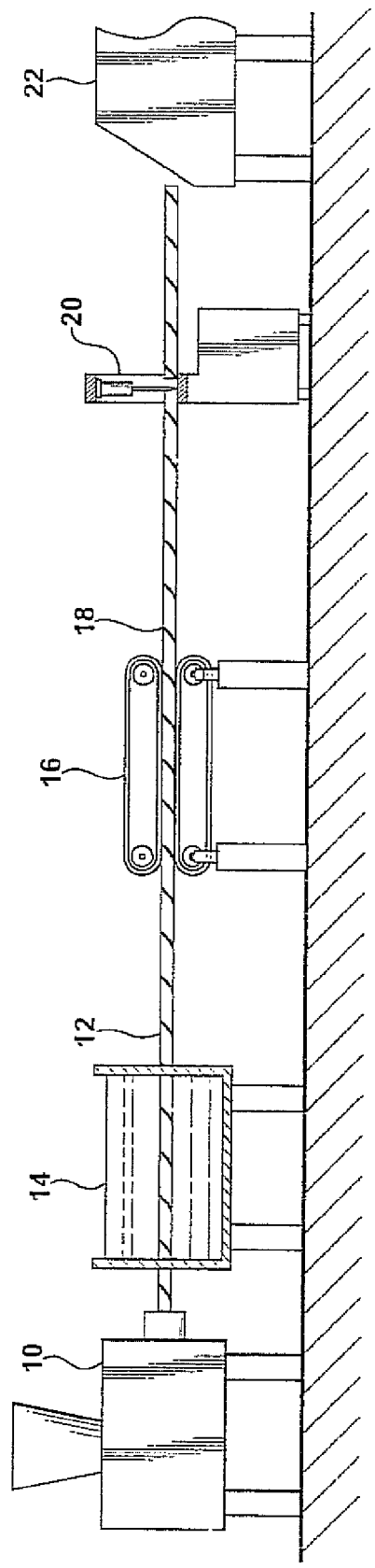
FIG. 1 is a schematic diagram of a prior art process line for extruding and producing conventional "barber pole" striped drinking straws.

Referring to the drawings, FIG. 1 illustrates a typical prior art process for forming conventional "barber pole" striped drinking straws. A plastic extruder 10 receives two or more copolymers of different colors and feeds them to parallel ports of an extrusion die to extrude a tube having the typical dimensions of a straw, in a striped fashion, with the colors alternating around the perimeter of the extruded tube. The extruded section 12 is passed through a water fed cooling tank 14. It is pulled from the extruder and through the cooling tank by a pulling and twisting device 16, which imposes a tensile force on the tube 12 and rotates the tube at a controlled rate, before it enters the cooling tank, to produce a spiraling color pattern at 18. The device 16 may constitute opposed belts or rollers that are inclined to the central axis of the tube 12 to continually twist it in one direction. The tube is then sliced into straw-like sections by a cutter 20 and passed to a subsequent automated process apparatus, such as a packaging machine 22. This process is relatively difficult to implement because the tube 18 is rotating when it reaches the cutter 20.

Figure 2:
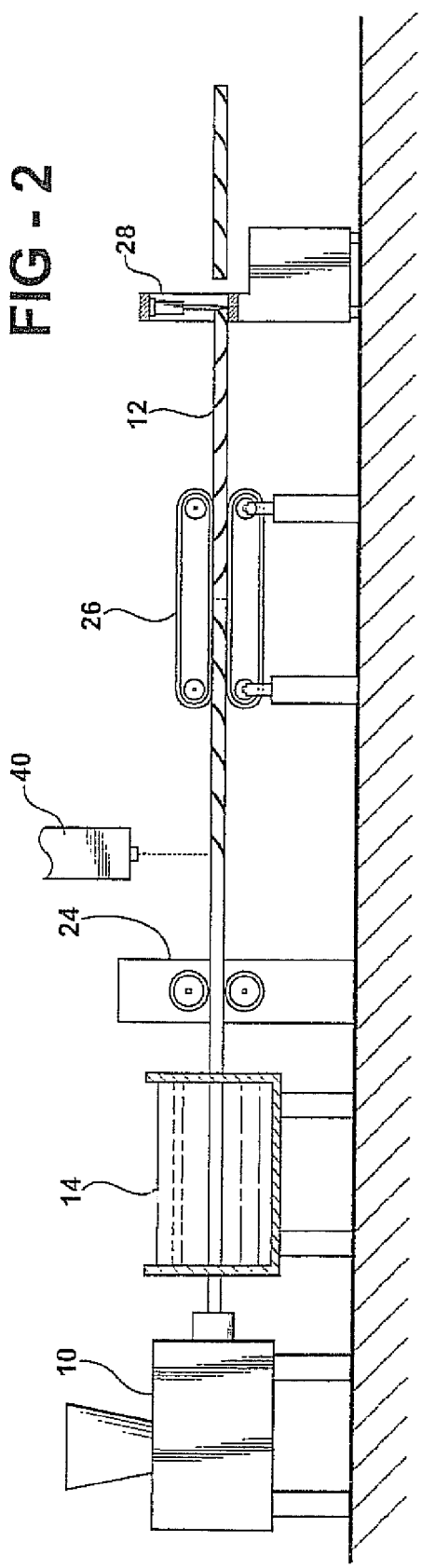
FIG. 2 is a schematic diagram of the apparatus of forming the drinking straws of the present invention.

The method of the present invention is depicted by the schematic diagram of FIG. 2 which uses like numbers for like elements. Again, the coextruder 10 generates a tube 12 having longitudinal stripes which is passed through a cooling tank 14 which lowers the temperature of at least the skin of the extruded tube below its liquid transition temperature to freeze the extruded straw. Any reasonable number of different colored plastics may be coextruded, typically two, three or four. Rather than the puller 16, the tube emerging from the tank 14 passes through a specially designed oscillator unit 24, which will subsequently be described in detail. The oscillator imparts forces on the tube which twist the tube as it is emerging from the extruder 10, and the twist is frozen by the cooling tank 14. At that point, the pattern on the tube has acquired a-form distinctive of the present invention. The extruded plastic is then pulled by a straight puller 26 which does not twist the extruded plastic and is passed to a conventional cutter 28.

Because of different consistencies of the various plastics, the twisting may also produce radial variations in the diameter of the tube as it is pulled from the extruder. This enhances the distinctive appearance of the striped straw. A sizing sleeve could be employed to remove this radial variation.

Figure 3:
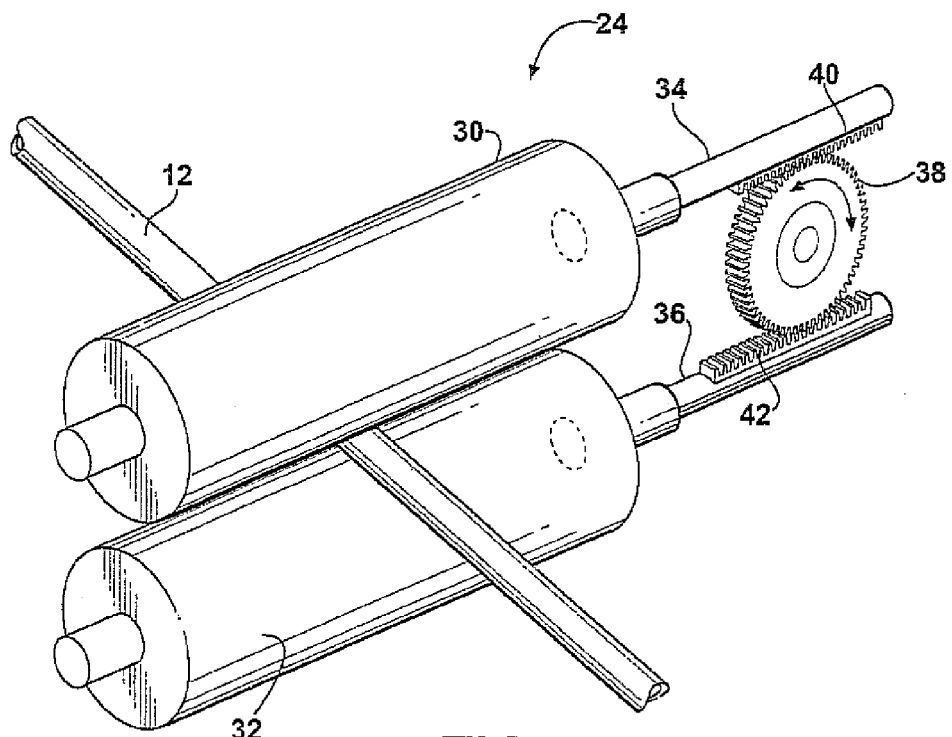
FIG. 3 is a detailed perspective view of the oscillating rollers of the present invention.
Figure 4A:
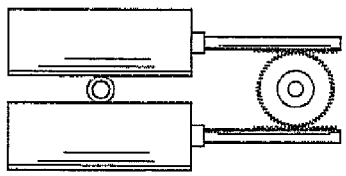
FIGS. 4a, b and c are schematic illustrations of successive lateral positions of the oscillating roller.
Figure 4B:
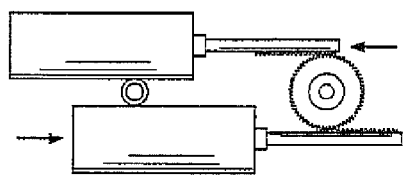
Figure 4C:
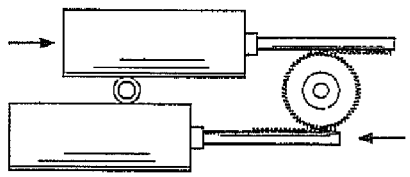
Figure 5:
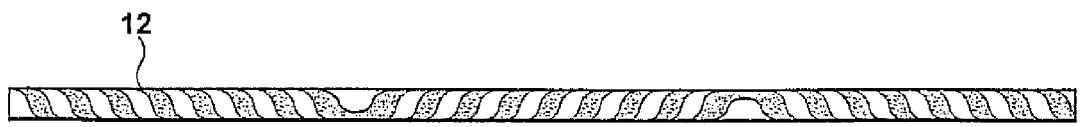
FIG. 5 is an illustration of the pattern on the resulting straw.

The nature of the oscillator 24 is illustrated in FIGS. 3 and 4. It consists of a pair of rolls 30 and 32 which are supported in opposition above and beneath the extruded section 12 and pinch the section between them. Means may be provided to urge the two rollers 30 and 32 toward one another. These could include springs, weights or other means (not shown). The roller 32 rotates about a central shaft 34 and the roller 32 rotates about a central shaft 36. Both of the shafts are supported on axes normal to the extension of the tube 12. The rollers are also slidably supported for lateral motion with respect to the tube 12 and a drive mechanism, such as a gear 38, which contacts splines 40 and 42, attached to the shafts 34 and 36 respectively, rotates in an oscillating manner so as to shift the rolls 30 and 32 laterally to the tube 12 in opposed directions. As may be seen in FIGS. 4a, 4b and 4c, when one roll moves to the left, the other roll moves to the right, and visa versa. This produces an extruded tube in which the stripes are rotated circumferentially about the central axis of the tube in a reversing pattern, as seen in FIG. 5.

The rotation of gear 38 may be changed at regular intervals or at random intervals to produce a variety of patterns on the resulting straws.

A laser decorating unit 40 may be imposed between the oscillator 24 and the puller 26 to produce decorative effects on all sides of the tube.

The invention claimed is:

1. The method of extruding a striped drinking straw, comprising:
    feeding two polymers of different color into an extruder to extrude a tube having longitudinal stripes extending along its length;
    feeding said tube to an oscillator comprising a pair of rolls supported for rotation about their central axis, disposed on opposed sides of the extruded tube, and urged toward one another by spring means, and a drive for oscillating the rolls in opposed directions along their central axes, the oscillator being operative to twist the exterior surface of the tube about its central axis, in alternating directions in timed relation to its extrusion;
    feeding the tube from the oscillator to a straight puller; and
    cutting the tube fed from the puller into straw-shaped lengths.

2. The method of claim 1 wherein the means for oscillating the rolls in alternating directions along their central axes comprise a pair of splines connected to the rolls and a reciprocating gear in engagement with both splines, so as to move them in opposed directions.

3. The method of claim 1 further including cooling at least the exterior of the extruded tube to below its liquid transition temperature following its extrusion.

4. The method of claim 1 further including a laser having its beam intersecting the extruded tube so as to decorate the tube.

\* \* \* \* \*